United States Patent [19]

Tada

[11] Patent Number: 4,895,026

[45] Date of Patent: Jan. 23, 1990

[54] SEMICONDUCTOR PRESSURE SENSOR

[75] Inventor: Yasuo Tada, Himeji, Japan

[73] Assignee: Mitsubishi Denki Kabushiki Kaisha, Tokyo, Japan

[21] Appl. No.: 317,485

[22] Filed: Mar. 1, 1989

[30] Foreign Application Priority Data

Mar. 1, 1988 [JP] Japan .............................. 63-27668[U]
Mar. 1, 1988 [JP] Japan .............................. 63-27669[U]

[51] Int. Cl.$^4$ .......................... G01L 7/08; G01L 9/06
[52] U.S. Cl. .......................................... 73/721; 338/4
[58] Field of Search ................ 73/721, 720, 718, 719, 73/722, 727, 753, 754, DIG. 4; 338/4, 42

[56] References Cited

U.S. PATENT DOCUMENTS 4,222,277  9/1980  Kurtz ..................................... 73/727
4,790,192 12/1988  Knecht et al. ......................... 73/721

FOREIGN PATENT DOCUMENTS 100026  6/1985  Japan .
 87338  6/1986  Japan .
102137  6/1987  Japan .

Primary Examiner—Donald O. Woodiel
Attorney, Agent, or Firm—Sughrue, Mion, Zinn, Macpeak and Seas

[57] ABSTRACT

A semiconductor pressure sensor comprising a first and a second identical pressure sensing diaphragm each having first and second pressure receiving surfaces and supported to align in a common plane in the same orientation. Two pressure sensing diaphragms have connected thereto similar bridge circuits made of piezoelectric elements for generating electrical signals indicative of the fluid pressure acting on the pressure sensing diaphragms. A first fluid passage connectable to a first pressure source is in communication with the first pressure receiving surface of the first diaphragm and the second pressure receiving surface of the second diaphragm, and a second fluid passage is in communication with a second pressure receiving surface of the first diaphragm and the first pressure receiving surface of the second diaphragm. The two electrical signal are supplied to a differential amplifier where two signals are substracted and an output electrical signal proportional to the magnitude of the result of the substraction between the first and the second electrical signals.

7 Claims, 2 Drawing Sheets

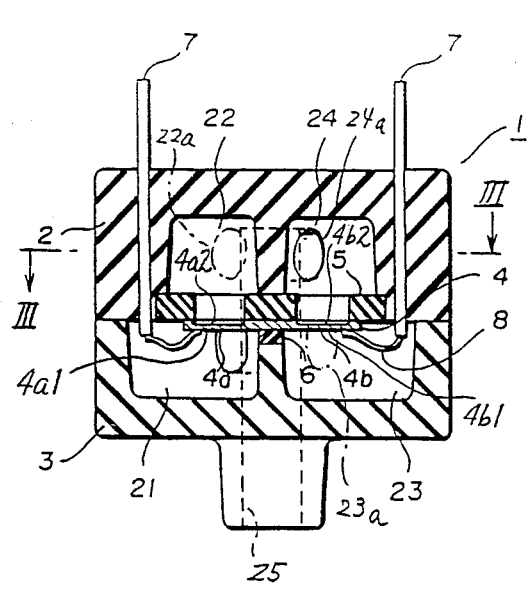
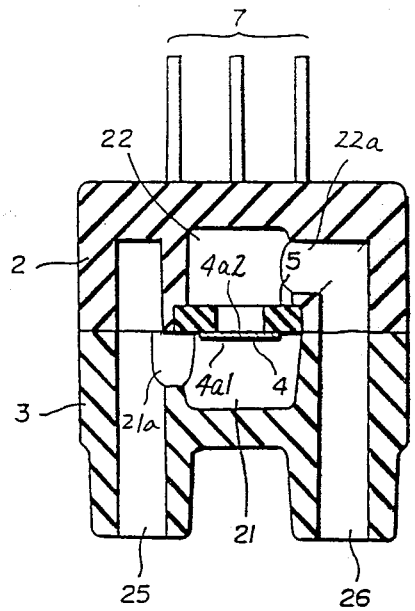
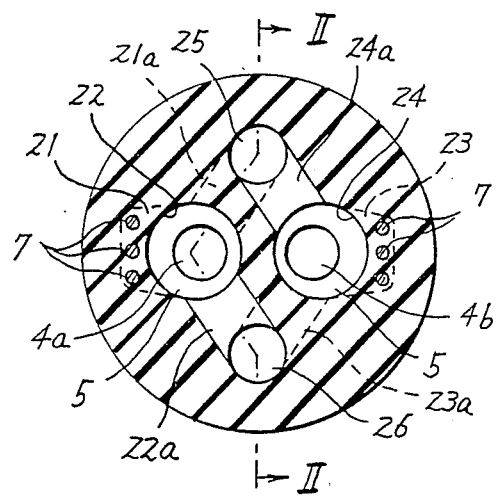

SEMICONDUCTOR PRESSURE SENSOR

BACKGROUND OF THE INVENTION

This invention relates to a semiconductor pressure sensor and more particularly to a semiconductor pressure sensor useful in detecting pressure difference in two fluids.

One example of the conventional semiconductor pressure sensor is disclosed in Japanese Patent Laid-Open No. 60-100026 for example, in which two sets of semiconductor pressure sensing units each including a diaphragm portion and four piezo-electric resistor elements connected in a bridge circuit are formed on a single common semiconductor substrate, and in which the fluid of which pressure is to be measured is applied to one of the pressure sensing units and two outputs from the respective bridge circuits are compared to make a substraction, whereby any error due to residual distortions can be eliminated.

Another example of a semiconductor pressure sensor is disclosed in Japanese U. M. Laid-Open No. 61-87338. In this conventional pressure sensor, an opening is provided at the central portion of a base and a pressure introducing conduit extends downwardly from the opening, and other openings for atmospher are disposed remotely from the central opening. A pressure sensing diaphragm for detecting the pressure difference between the pressure introducing conduit and the atmospheric pressure is centrally disposed, and the opening for the atmospheric pressure is covered by the semiconductor chip which is covered by a cap.

Since the conventional semiconductor pressure sensors are constructed as above described, the sensitivities of the pressure sensing diaphragm and the control circuit must be made extremely high in order to detect a very small pressure. When the sensitivity of the pressure sensor is increased too much, the pressure sensor becomes too sensitive to responds even to the acceleration or vibration acting on the diaphragm of the sensor, providing an erroneous pressure signal.

SUMMARY OF THE INVENTION

Accordingly, one of the objects of the present invention is to provide a semiconductor pressure sensor free from the above problem.

Another object of the present invention is to provide a semiconductor pressure sensor which can detect very small pressure.

Further object of the present invention is to provide a semiconductor pressure sensor which is sensitive to even a very small pressure and yet immune from responding to any mechanical force acting on the sensor.

With the above objects in view, the semiconductor pressure sensor of the present invention comprises a first and a second identical pressure sensing diaphragm each having first and second pressure receiving surfaces and supported to align in a common plane in the same orientation. Two pressure sensing diaphrams have connected thereto similar bridge circuits made of piezoelectric elements for generating electrical signals indicative of the fluid pressure acting on the pressure sensing diaphragms. A first fluid passage connectable to a first pressure source is in communication with the first pressure receiving surface of the first diaphragm and the second pressure receiving surface of the second diaphragm, and a second fluid passage is in communication with a second pressure receiving surface of the first diaphragm and the first pressure receiving surface of the second diaphragm. The two electrical signal are supplied to a differential amplifier where two signals are substracted and an output electrical signal proportional to the magnitude of the result of the substraction between the first and the second electrical signals.

In one embodiment, the first and the second pressure sensing diaphragms may be semiconductor diaphragms integrally formed on the respective separate semiconductor substrates or, alternatively, they may be semiconductor diaphragms integrally formed on a single common semiconductor substrate. The signal generating means may comprise four piezoelectric resistor elements and arranged in a bridge circuit.

BRIEF DESCRIPTION OF THE DRAWINGS

The present invention will becoome more readily apparent form the following detailed description of the preferred embodiments of the present invention taken in cojunction with the accompanying drawings, in which:

FIG. 1 is a sectional view of a semiconductor pressure sensor constructed in accordance with the present invention;

FIG. 2 is a sectional view of the semiconductor pressure sensor of the present invention taken along line II—II of FIG. 3:

FIG. 3 is a sectional view of the semiconductor pressure sensor of the present invention taken along line III—III of FIG. 1;

DESCRIPTION OF THE PREFERRED EMBODIMENTS

Figures 4, 5:
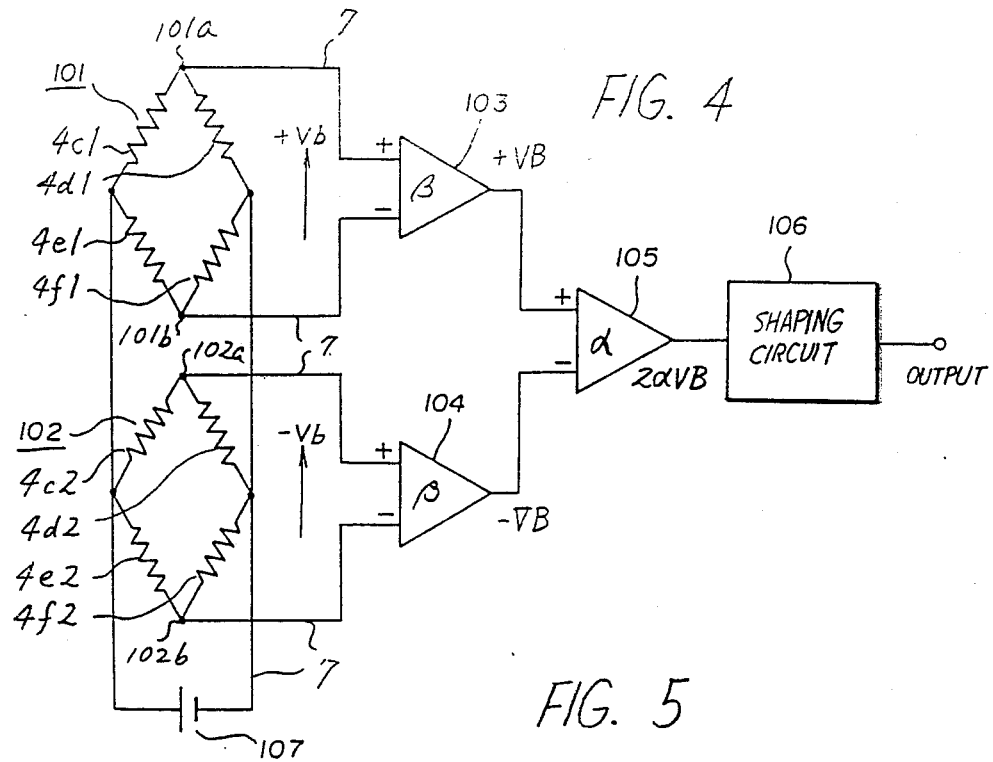
FIG. 4 is a circuit diagram of the pressure sensing circuit used in the semiconductor pressure sensor shown in FIG. 1.
FIG. 5 is a view similar to FIG. 1 but showing a modified embodiment of the semiconductor pressure sensor of the present invention.

FIGS. 1 to 4 illustrate one embodiment of a semiconductor pressure sensor of the present invention. The pressure sensor comprises a housing 1 having a base 3 and a cover 2 and a first pressure sensing diaphragm 4a and a second pressure sensing diaphragm 4b housed within the housing 1. The housing 1 has defined therein a first fluid passage 25 connectable to an external pressure source (not shown) such as an engine intake manifold of which pressure is to be measured. The housing 1 also defines therein a second fluid passage 26 also connectable to another external pressure source (not shown).

The housing 1 has a first pressure chamber 21 connected to the first fluid passage 25 through a port 21a and a second pressure chamber 22 connected to the second fluid passage 26 through a port 22a. Between the first and the second pressure chambers 21 and 22, the first pressure sensing diaphragm 4a is disposed so that the fluid pressure within the first pressure chamber 21 can be received at its first pressure-receiving surface 4a1 which is the bottom surface in the illustrated embodiment and that the pressure in the second pressure chamber 22 can be received at its second pressure-receiving surface 4a2 which is the top surface of the diaphragm 4a.

The housing 1 also has a third pressure chamber 23 connected to the second fluid passage 26 through a port 23a and a fourth pressure chamber 24 connected to the first fluid passage 25 through a port 24a. Between the third and the fourth pressure chambers 23 and 24, the second pressure sensing diaphragm 4b is disposed so that the fluid pressure within the third pressure chamber 23 can be received at its first pressure-receiving surface 4b1 which is the bottom surface in the illustrated embodiment and that the pressure in the fourth pressure chamber 24 can be received at its second pressure-receiving surface 4b2 which is the top surface of the diaphragm 4b.

When the pressure within the first fluid passage 25 is higher than that in the second fluid passages 26, the fluid pressure is higher in the first and the fourth pressure chambers 21 and 24 than in the second and the third pressure chambers 22 and 23. Therefore, the first pressure sensing diaphragm 4a is bent toward the second pressure chamber 22 and the second sensing diaphragm 4b is bent toward the third pressure chamber 23. When the pressure within the first fluid passage 25 becomes lower than that in the second fluid passages 26, the fluid pressure is lower in the first and the fourth pressure chambers 21 and 24 than in the second and the third pressure chambers 22 and 23. Therefore, the first pressure sensing diaphragm 4a is bent toward the first pressure chamber 21 and the second pressure sensing diaphragm 4b is bent toward the fourth pressure chamber 24.

In the illustrated embodiment, the first and second pressure sensing diaphragms 4a and 4b are integrally formed in a semiconductor substrate 4 on which piezoelectric resistor elements (see resistors 4c, 4d, 4e and 4f shown in FIG. 4) are also formed for detecting the distortion of the diaphragms 4a and 4b. As will be described in more detail later, these arrangements constitutes means for generating an electrical signal indicative of the fluid pressure acting on the pressure sensing diaphragms. The pressure sensing diaphragms 4a and 4b are supported and positioned in a common plane with their first pressure receiving surfaces 4a1 and 4b1 directed on one side of the common plane and their second pressure receiving surfaces 4a2 and 4b2 directed on the other side of the common plane. The semiconductor substrate 4 having the pressure sensing diaphragms 4a and 4b is mounted on a frame 5 supported between the base 3 and the cover 2 of the housing 1. A flexible seal member 6 is inserted between the base 3 of the housing 1 and the semiconductor substrate 4 in order to ensure that, while providing a hermetic seal between two pressure chambers, no external mechanical force is applied from the housing 1 onto the semiconductor substrate 4 which may cause generation of an error signal from the diaphragms 4a and 4b even when the housing 1 is deformed by any mechanical force or thermal expansion.

As best seen from FIG. 4, piezoelectric resistor elements 4c1, 4d1, 4e1 and 4f1 formed on the first semiconductor pressure sensing diaphragm 4a and piezoelectric resistor elements 4c2, 4d2, 4e2 and 4f2 on the second semiconductor pressure sensing diaphragm 4b are electrically connected to form a first and a second bridge circuit 101 and 102, respectively, connected to a power source 107. When the pressure sensing diaphragms 4a and 4b are distorted or bent by a pressure difference acting thereon, the bridge circuits 101 and 102 provide output signals on their outputs 101a and 101b and 102a and 102b. The outputs 101a and 101b of the first bridge circuit 101 are connected to a first differential amplifier 103, and the outputs 102a and 102b of the second bridge circuit 102 are connected to a second differential amplifier 104. Electrical connectons of the bridge circuits 101 and 102 to the external circuits are provided by leads 7 which are also illustrated in FIGS. 1 to 3 as hermetically extending through the housing 1.

When the first pressure sensing diaphragm 4a bends to project toward the second pressure chamber 22 and there is a difference $+Vb$ between two output signals provided from the outputs 101a and 101b of the first bridge circuit 101, the first differential amplifier 103 multiplies the incoming signal $+Vb$ by a factor of $\beta$ to generate a first electrical signal $+Vb=\beta\cdot(+Vb)$ indicative of any distortion of the first pressure sensing diaphragm 4a due to the differential fluid pressure acting thereon. Similarly, when the second pressure sensing diaphragm 4b bends toward the third pressure chamber 23 and there is a difference $-Vb$ between the two output signals provided from the outputs 102a and 102b of the second bridge circuit 102, the second differential amplifier 104 generates a second electrical signal $-VB=\beta\cdot(-Vb)$ indicative of a distortion of the second pressure sensing diaphragm 4b due to the differential fluid pressure acting thereon.

Output terminals of the first and the second differential amplifiers 103 and 104 are connected to input terminals of a third differential amplifier 105. In the third differential amplifier 105, the first and the second electrical signals $+VB$ and $-VB$ provided from the first and the second differential amplifiers 103 and 104 are substrated to obtain a difference signal 2VB, which is then amplified to provide an output signal $\alpha\cdot 2VB$ proportional to the magnitude of the result of the substraction between the first and the second electrical signals. This output signal $2\alpha VB$ from the third differential amplifier 105 is supplied to a waveform shaping circuit 106 so that a shaped output signal can be supplied from an output terminal 108 of the pressure sensor.

When the pressure within the first fluid passage 25 becomes lower than that in the second fluid passages 26 and the first pressure sensing diaphragm 4a is bent toward the first pressure chamber 21 and the second pressure sensing diaphragm 4b is bent toward the fourth pressure chamber 24, the output from the first bridge circuit 101 is $-Vb$ and the output from the first differential amplifier 103 is $-VB$, and the output from the second bridge circuit 102 is $+Vb$ and the output from the second differential amplifier 104 is $+VB$. Therefore, the output from the third differential amplifier 105 is $2\alpha VB$ which is equal to the output signal obtained in the first condition. Thus, it is apparent that the magnitude of the output or the sensitivity of the pressure sensor of the present invention is two times of that of the conventional sensor.

When an acceleration such as vibration including a component perpendicular to the plane in which the first and the second pressure sensing diaphragms 4a and 4b lie is applied to the pressure sensor of the present invention, these pressure sensing diaphragms 4a and 4b are simultaneously bent in the same direction by the same amount. Therefore, when an output $+Vb$ is generated from the first bridge circuit 101, then the equal output $+Vb$ is generated at the output terminal of the second bridge circuit 102. These signals $+Vb$ are amplified at the first and the second differential amplifiers 103 and 104, respectively, into two equal outputs $+VB=\beta\cdot+Vb$, which are then substracted in the third differential amplifier 105, resulting in no output signal from the third differential amplifier 105. Therefore, the pressure sensor of the present invention does not respond to the acceleration or vibration.

In the illustrated embodiment, the first and the second pressure sensing diaphragms 4a and 4b are integrally formed in a single common semiconductor substrate 4. This arrangement ensures that the output signals generated by the piezoelectric resistor elements and therefore the output signals from the first and the second bridge circuits 101 and 102 are equal to each other so that they are completely cancelled out in the differential amplifier.

If it is preferable, as shown in FIG. 5, two separate pressure sensing diaphragms 41a and 41b may be employed. In this embodiment, the seal member 6 is not provided and the housing 1 directly engages against the support frame 5.

While the third differential amplifier 105 is used to substract and amplify two output signals VB from the first and the second differential amplifiers 103 and 104, the third differential amplifier 105 may be replaced with a suitable computer where the above two signals are computed to obtain an output equivalent to the output electrical signal from the third differential amplifier 105.

As has been described, the semiconductor pressure sensor of the present invention comprises a first and a second identical pressure sensing diaphragm each having first and second pressure receiving surfaces and supported to align in a common plane in the same orientation. A first fluid passage connectable to a first pressure source is in communication with the first pressure receiving surface of the first diaphragm and the second pressure receiving surface of the second diaphragm, and a second fluid passage is in communication with a second pressure receiving surface of the first diaphragm and the first pressure receiving surface of the second diaphragm. The two electrical signal are supplied to a differential amplifier where two signals are substracted and an output electrical signal proportional to the magnitude of the result of the substraction between the first and the second electrical signals. Therefore, the semiconductor pressure sensor of the present invention can detect even a very small pressure difference and yet is immune from responding to any mechanical force acting on the sensor.

What is claimed is:

1. A pressure sensor comprising:
   a first pressure sensing diaphragm having first and second pressure receiving surfaces;
   means connected to said first pressure sensing diaphragm for generating a first electrical signal indicative of the fluid pressure acting on said first pressure sensing diaphragm;
   a second pressure sensing diaphragm similar to said first pressure sensing diaphragm and having first and second pressure receiving surfaces, said first and second pressure sensing diaphragms are positioned substantially in a common plane with their first pressure receiving surfaces on one side of said common plane and their second pressure receiving surfaces on the other side of said common plane;
   means connected to said second pressure sensing diaphragm for generating a second electrical signal indicative of the pressure acting on said second pressure sensing diaphragm;
   means for defining a first fluid passage connectable to a first pressure source, said first fluid passage being in communication with said first pressure receiving surface of said first pressure sensing diaphragm and said second pressure receiving surface of said second pressure sensing diaphragm;
   means for defining a second fluid passage connectable to a second pressure source, said second fluid passage being in communication with said second pressure receiving surface of said first pressure sensing diaphragm and said first pressure receiving surface of said second pressure sensing surface;
   means for making a substraction of said first and second electrical signals and providing an output electrical signal proportional to the magnitude of the result of said substraction between said first and second electrical signals.

2. A pressure sensor as claimed in claim 1, wherein each of said first and said second pressure sensing diaphragms is a semiconductor diaphragm formed in a semiconductor substrate.

3. A pressure sensor as claimed in claim 1, wherein said first and said second pressure sensing diaphragms are semiconductor diaphragms formed on a single common semiconductor substrate.

4. A pressure sensor as claimed in claim 3, wherein a flexible seal member is inserted between said housing and said semiconductor substrate.

5. A pressure sensor as claimed in claim 1, wherein each of said first and second signal generating means comprises four piezoelectric resistors formed on a semiconductor substrate and arranged in a bridge circuit.

6. A pressure sensor as claimed in claim 1, wherein said passage means for defining said first and said second fluid passages comprises a housing.

7. A pressure sensor as claimed in claim 1, wherein said means for making a substraction and generating said output electrical signal comprises a differential amplifier.

* * * * *